US011921463B2

(12) United States Patent
Matsumoto

(10) Patent No.: US 11,921,463 B2
(45) Date of Patent: Mar. 5, 2024

(54) WATCH

(71) Applicant: Seiko Epson Corporation, Tokyo (JP)

(72) Inventor: Kenichiro Matsumoto, Fujimi (JP)

(73) Assignee: SEIKO EPSON CORPORATION (JP)

( * ) Notice: Subject to any disclaimer, the term of this patent is extended or adjusted under 35 U.S.C. 154(b) by 358 days.

(21) Appl. No.: 17/472,834

(22) Filed: Sep. 13, 2021

(65) Prior Publication Data

US 2022/0083007 A1 Mar. 17, 2022

(30) Foreign Application Priority Data

Sep. 14, 2020 (JP) ................................ 2020-153572

(51) Int. Cl.

*G04B 19/28* (2006.01)
*G04B 37/08* (2006.01)
*G04B 39/00* (2006.01)

(52) U.S. Cl.

CPC .......... *G04B 19/283* (2013.01); *G04B 37/08* (2013.01); *G04B 39/006* (2013.01)

(58) Field of Classification Search

CPC .... G04B 37/084; G04B 37/08; G04B 39/006; G04B 19/283; G04B 45/0092; G04B 45/0084; G04B 37/11; G04B 37/0008; G04B 19/286; G04B 37/0075

See application file for complete search history.

(56) References Cited

U.S. PATENT DOCUMENTS

| | | | | |
|---|---|---|---|---|
| 5,319,617 A * | 6/1994 | Sonoda ................ | G04B 19/283 368/294 |
| 6,616,329 B1 * | 9/2003 | Sasaki .................. | G04B 19/283 368/300 |
| 7,976,214 B2 * | 7/2011 | Hiranuma ............ | G04B 37/005 368/309 |
| 8,794,824 B2 * | 8/2014 | Hirayama ............ | G04B 37/084 368/294 |
| 11,163,265 B2 * | 11/2021 | Della Santa ......... | G04B 19/283 |

FOREIGN PATENT DOCUMENTS

| | | |
|---|---|---|
| JP | H11-118949 A | 4/1999 |
| JP | 2015-108512 A | 6/2015 |

* cited by examiner

*Primary Examiner* — Edwin A. Leon
(74) *Attorney, Agent, or Firm* — Harness, Dickey & Pierce, P.L.C.

(57) ABSTRACT

The present disclosure includes a case body configured to accommodate a movement, and a rotating bezel attached to the case body. The rotating bezel includes a bezel body having an annular shape, and a display plate detachably attached to the bezel body. An engagement protrusion protruding toward the bezel body and being continuous in a circumferential direction is provided at the display plate. A plastic gasket having an annular shape is disposed between the bezel body and the engagement protrusion. A first recessed portion is provided in an outer circumference of the display plate. A second recessed portion is provided in the engagement protrusion of the display plate so as to correspond to a position of the first recessed portion.

9 Claims, 12 Drawing Sheets

WATCH

The present application is based on, and claims priority from JP Application Serial Number 2020-153572, filed Sep. 14, 2020, the disclosure of which is hereby incorporated by reference herein in its entirety.

BACKGROUND

1. Technical Field

The present disclosure relates to a watch including a bezel.

2. Related Art

A watch has been known that includes a bezel in which a graduation and the like corresponding to a hand of the watch are displayed. In such a watch, by appropriately rotating the bezel and setting a relationship between the graduation and the hand, elapsed time from a certain point in time and the like can be read.

For example, JP-A-2015-108512 discloses a watch including a rotating bezel including a bezel body and a display plate mounted on the bezel body. JP-A-2015-108512 describes a configuration in which the display plate can be removed from the bezel body on a display surface side of the watch. Specifically, the display plate is formed of a metal material. The bezel body includes an engagement protrusion for fixing with a plastic gasket being interposed. A recessed portion for insertion of a spatula to pry open the display plate is provided in a part of an outer circumference of the display plate. When the display plate is removed, the spatula is inserted into the recessed portion to pry open the display plate at the engagement protrusion by leverage with an outer edge of the bezel body as a fulcrum. The engagement protrusion is provided in an annular shape on a rear surface of the display plate at the same height as that of the plastic gasket.

However, when a brittle material such as ceramic is used as a material of the display plate, the display plate may be damaged when the display plate is removed from the bezel body in the configuration of JP-A-2015-108512. Specifically, when a jig such as the spatula is inserted into the recessed portion, there is a concern that a tip of the jig abuts the engagement protrusion, and damages the engagement protrusion and a peripheral portion. In other words, a watch in which a display plate can be easily removed even when a brittle material is used as a material of the display plate has been required.

SUMMARY

A watch includes a case body configured to accommodate a movement, and a bezel attached to the case body, where the bezel includes a bezel body having an annular shape, and a display plate detachably attached to the bezel body, an engagement protrusion protruding toward the bezel body and being continuous in a circumferential direction is provided at the display plate, an elastic member having an annular shape is disposed between the bezel body and the engagement protrusion, a first recessed portion is provided in an outer circumference of the display plate, and a second recessed portion is provided in the engagement protrusion of the display plate so as to correspond to a position of the first recessed portion.

DESCRIPTION OF EXEMPLARY EMBODIMENTS

Figure 1:
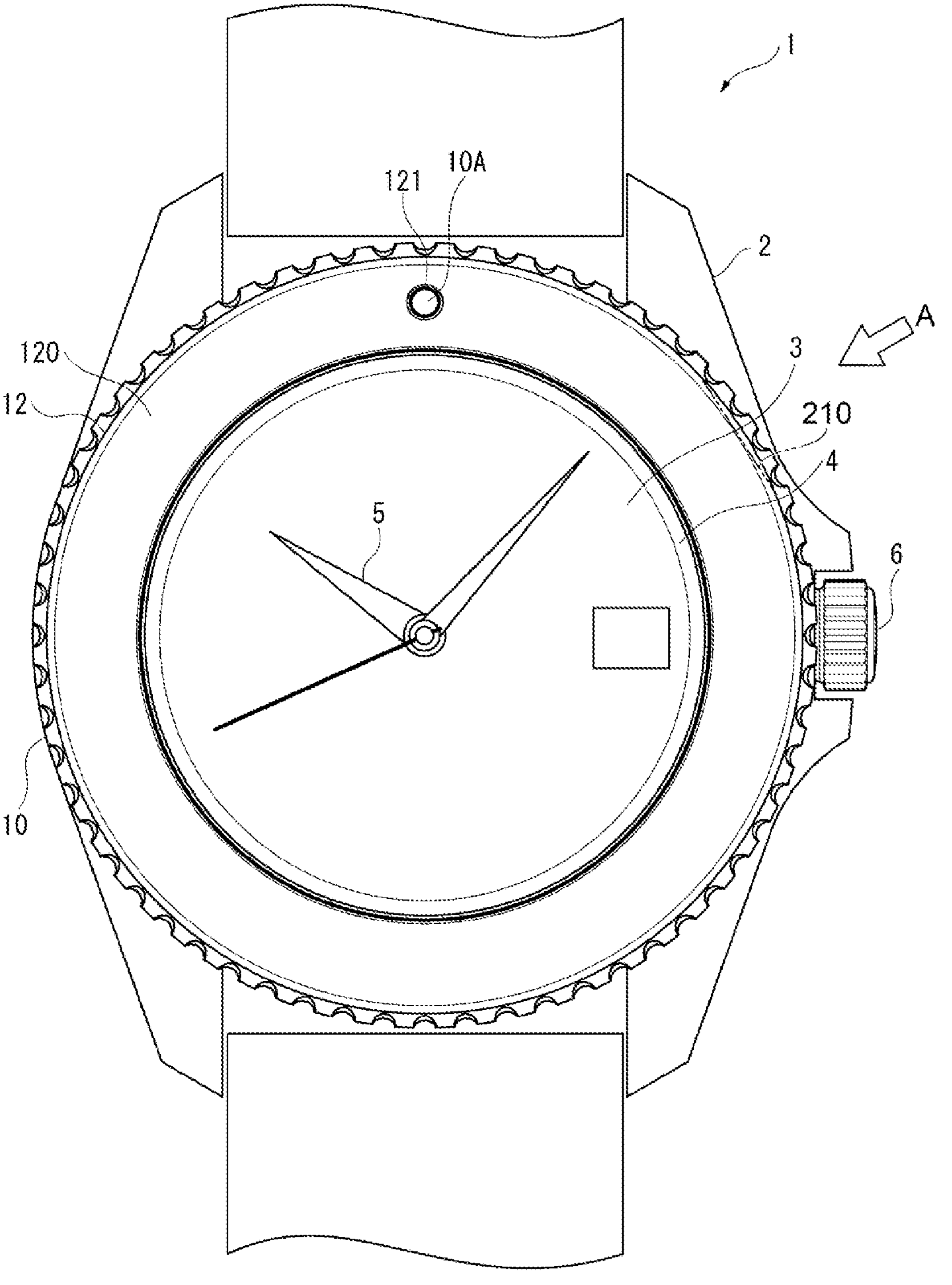
FIG. 1 is a plan view illustrating a rotating bezel-equipped watch.
Figure 2A:
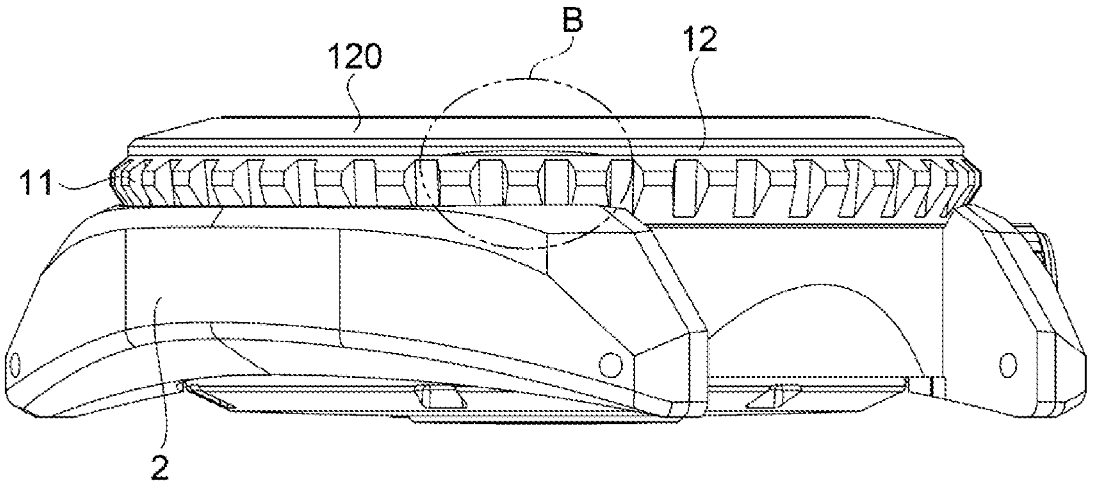
FIG. 2A is a side view of the rotating bezel-equipped watch illustrated in FIG. 1 when viewed from an A direction.
Figure 2B:
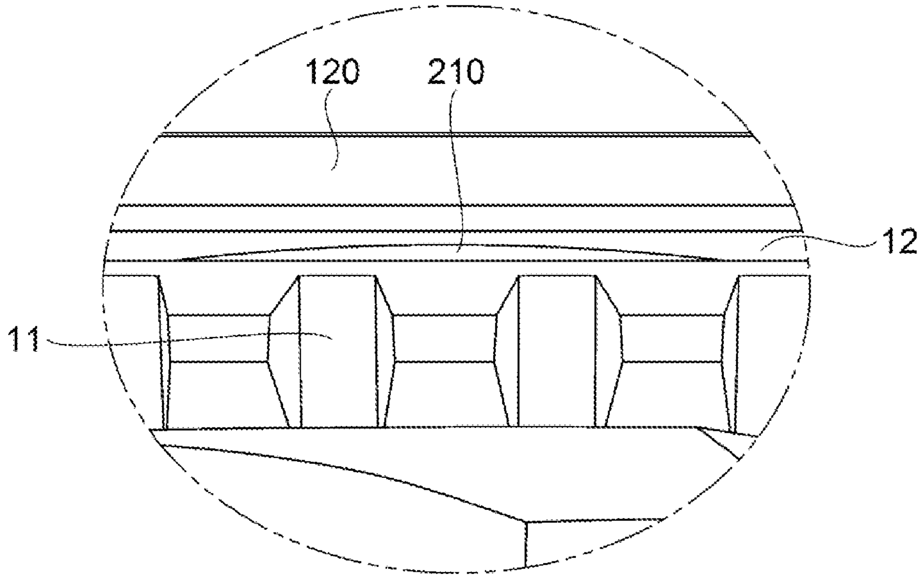
FIG. 2B is an enlarged view illustrating an enlarged B portion of the rotating bezel-equipped watch illustrated in FIG. 2A.

As one example of a watch, a structure of a rotating bezel-equipped watch 1 will be described with reference to FIGS. 1 to 4.

As illustrated in FIGS. 1 to 4, the rotating bezel-equipped watch 1 includes a case body 2 in a flat cylindrical shape. A dial 3 is installed inside the case body 2, and a cover glass 4 is installed so as to cover the dial 3. A hand 5 including a seconds hand, a minute hand, and an hour hand is provided on the dial 3, and a time display can be visually recognized from a front surface side of the watch through the cover glass 4.

A movement 50 that drives the hand 5 is accommodated inside the case body 2. The movement 50 includes a step motor that drives the hand 5, and a train wheel, and also includes a control printed wired board that controls driving of the step motor. A crown 6 for adjusting and setting the movement 50 and the hand 5 is disposed on a side surface of the case body 2. Note that a button and the like may be provided adjacent to the crown 6.

The rotating bezel-equipped watch 1 includes, as an outer packaging component that accommodates the movement 50, the case body 2, the cover glass 4, a case back 7, a rotating bezel 10 as a bezel, and a glass bezel 13. The rotating bezel 10 includes a bezel body 11 in which a recessed portion and a protruding portion are formed in an outer circumference, and a display plate 12 detachably attached to the bezel body 11 on which a character and the like are displayed.

In a two o'clock direction (an A direction) in the display plate 12, a first recessed portion 210 is formed for insertion of a jig 250 (see FIG. 8B) such as a spatula used when the display plate 12 is removed from the bezel body 11. Note that a member with a reference sign that is not illustrated in FIGS. 1 to 4 will be described together in description of FIG. 6 that will be described later.

Figure 5A:
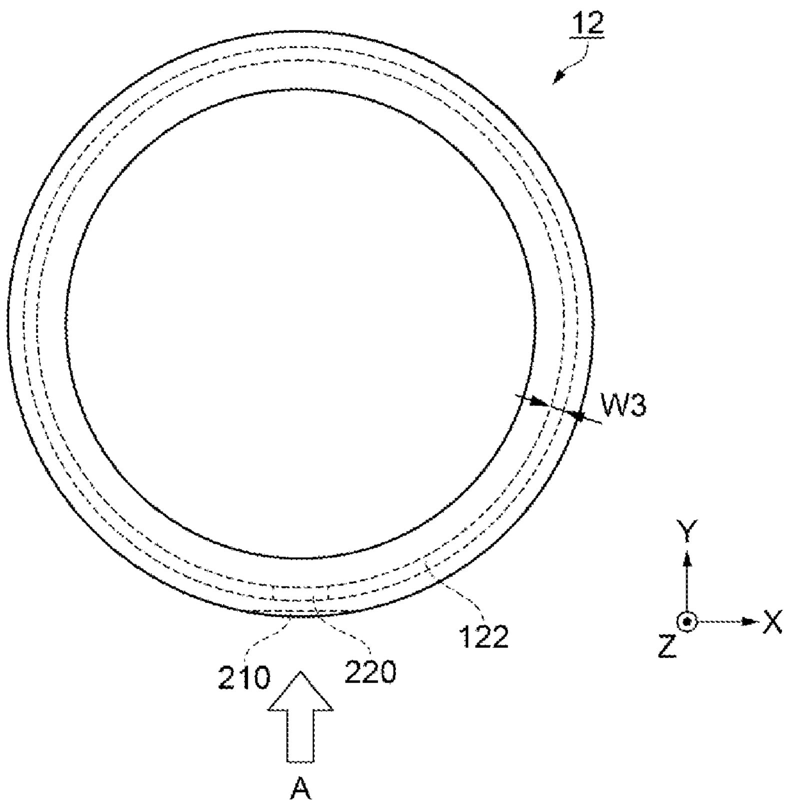
FIG. 5A is a plan view illustrating a configuration of a display plate.
Figure 5B:
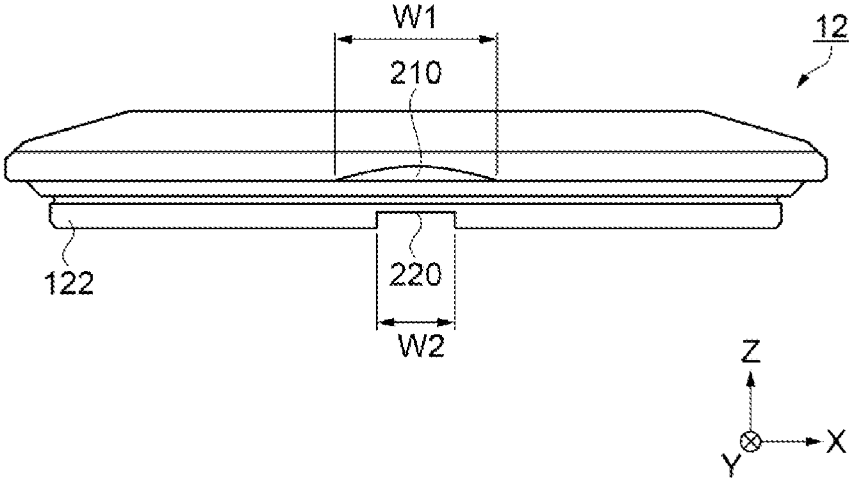
FIG. 5B is a side view illustrating the configuration of the display plate.
Figure 5C:
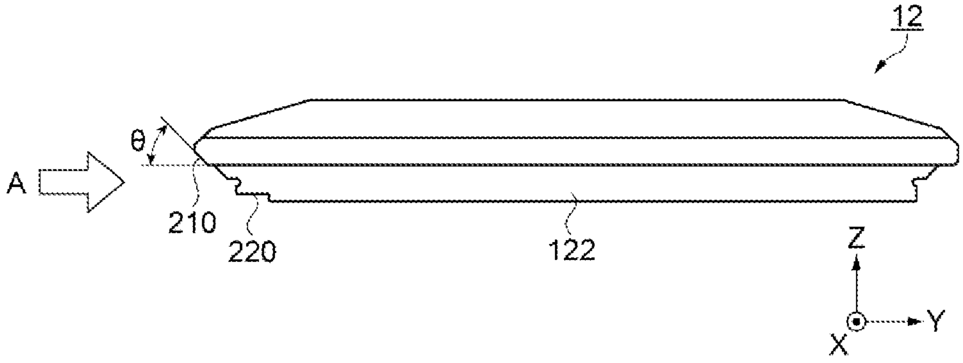
FIG. 5C is a side view illustrating the configuration of the display plate.
Figure 5D:
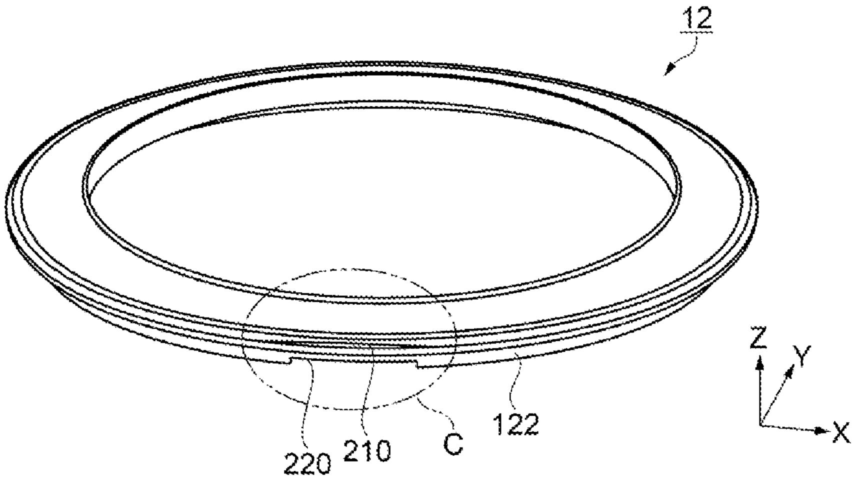
FIG. 5D is a perspective view illustrating the configuration of the display plate.
Figure 5E:
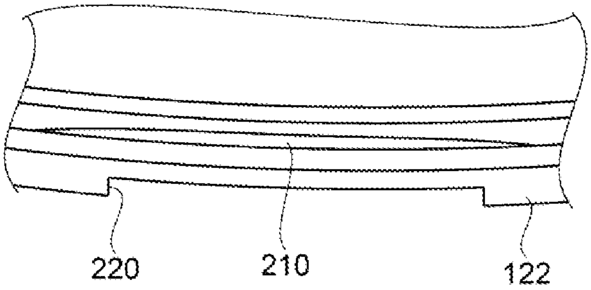
FIG. 5E is an enlarged perspective view illustrating an enlarged C portion of the display plate illustrated in FIG. 5D.

Next, a configuration of the display plate 12 of the rotating bezel-equipped watch 1 will be specifically described. FIG. 5A is a plan view illustrating the configuration of the display plate 12, and is disposed with the A direction on a lower side of a paper plane in FIG. 5A. FIG. 5B is a side view of the display plate 12 illustrated in FIG. 5A when viewed from the A direction. FIG. 5C is a side view of a side surface of the display plate 12 with the A direction on a left side. FIG. 5D is a perspective view illustrating the configuration of the display plate 12. FIG. 5E is an enlarged perspective view illustrating an enlarged C portion of the display plate 12 illustrated in FIG. 5D. Note that the A direction according to the present exemplary embodiment corresponds to the two o'clock direction of the rotating bezel-equipped watch 1.

Figure 3:
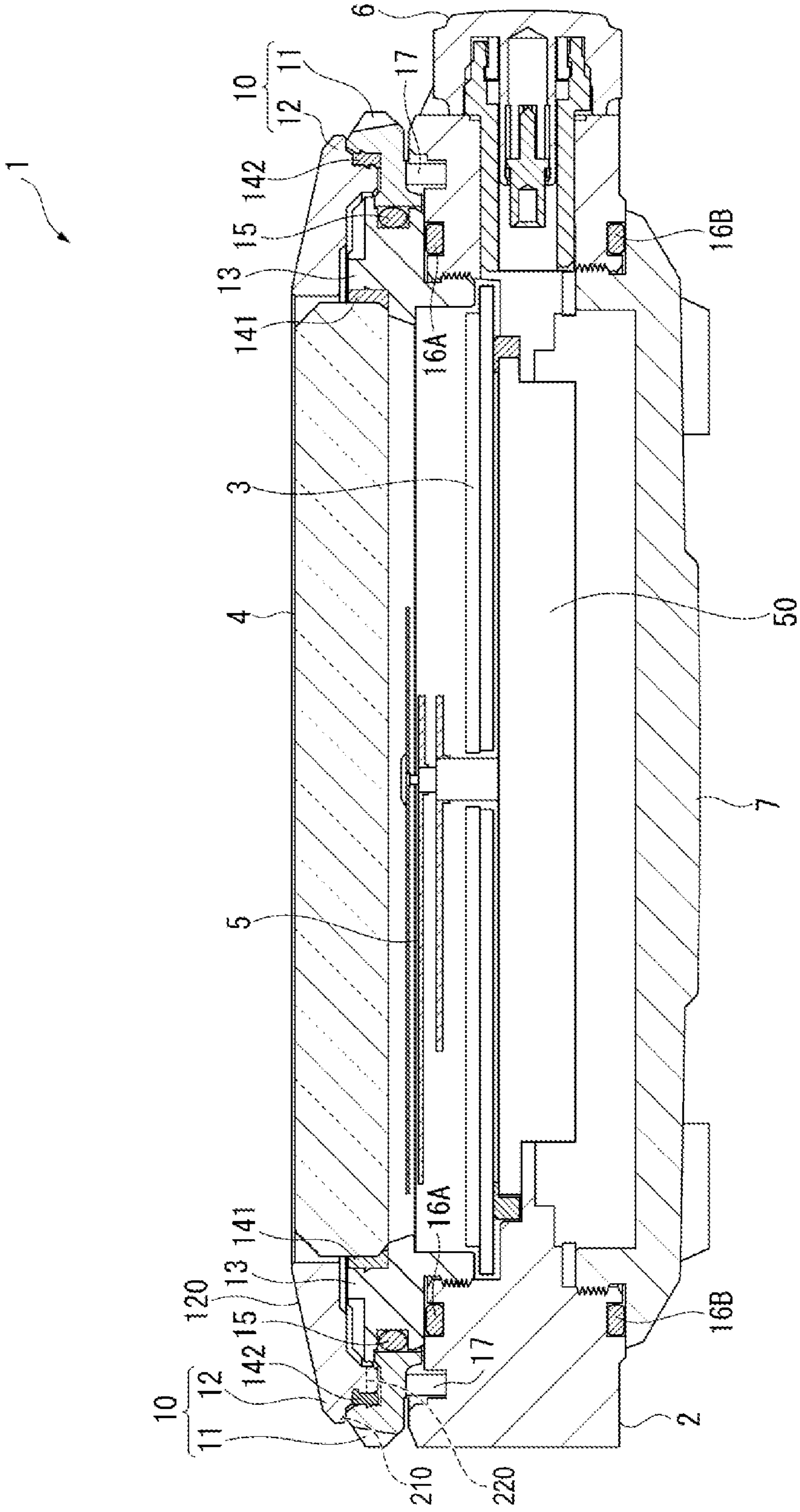
FIG. 3 is a cross-sectional view illustrating an internal structure of the rotating bezel-equipped watch.

As illustrated in FIGS. 5A to 5E, the display plate 12 is an annular member, and constitutes a front surface of the rotating bezel 10 (see FIG. 3). A material of the display plate 12 is, for example, ceramic such as zirconia-based ceramic. Note that a material of the display plate 12 is not limited to ceramic, and may be, for example, a brittle material such as sapphire glass, and a metal material such as stainless steel and titanium. By using ceramic for the display plate 12, a variation of colors can be increased.

An engagement protrusion 122 that engages with the bezel body 11, which will be described later, is formed on a rear surface side of the display plate 12. The engagement protrusion 122 is a circumferentially continuous rib. As described above, the jig 250 such as a spatula is inserted into a portion of the outer circumference of the display plate 12 in the A direction, and the first recessed portion 210 is formed for removing the display plate 12 from the bezel body 11. As illustrated in FIG. 5C, the first recessed portion 210 is, for example, an inclined surface being cut at an angle θ of 30° with respect to a horizontal direction.

Further, a second recessed portion 220 is formed, in a portion of the engagement protrusion 122 in the A direction, so as to correspond to a position of the first recessed portion 210. In this way, the display plate 12 is detachably attached to the bezel body 11. As illustrated in FIG. 5B, a width W1 of the first recessed portion 210 is, for example, 7 mm. A width W2 of the second recessed portion 220 is, for example, 4 mm, and is smaller than the width W1 of the first recessed portion 210. Note that the widths W1 and W2 may be set in accordance with a size of the jig 250, such as a spatula, to be used. Further, as illustrated in FIG. 5A, a thickness W3 of the engagement protrusion 122 is, for example, equal to or greater than 0.7 mm.

Note that the description that the "second recessed portion 220 is formed so as to correspond to the position of the first recessed portion 210" means that the second recessed portion 220 is formed in a position in which contact of a tip of the jig 250 with the engagement protrusion 122 can be reduced when the jig 250 is inserted into the first recessed portion 210. For example, in plan view viewed from a central axis direction of the display plate 12, the description includes that the second recessed portion 220 is formed such that, when two imaginary lines connecting the center of the display plate 12 and both ends of the first recessed portion 210 are drawn, the second recessed portion 220 is located inside the imaginary lines. Further, in the plan view, the second recessed portion 220 may be formed such that an imaginary line connecting the center of the display plate 12 and the center of the first recessed portion 210 coincides with an imaginary line connecting the center of the display plate 12 and the center of the second recessed portion 220.

A groove portion 230 (see FIG. 6) to which apart of a plastic gasket 142 (see FIG. 8A) as an elastic member enters is continuously provided in a circumferential direction in an outer circumference of the engagement protrusion 122. Note that the second recessed portion 220 is provided in a position that is not in contact with the groove portion 230. The second recessed portion 220 is provided in the position that is not in contact with the groove portion 230, and thus the groove portion 230 can be left throughout the entire engagement protrusion 122 in the circumferential direction without being affected by a notch shape of the second recessed portion 220, a part of the plastic gasket 142 can enter the groove portion 230, and a fixing force between the bezel body 11 and the display plate 12 can be improved.

Figure 6:
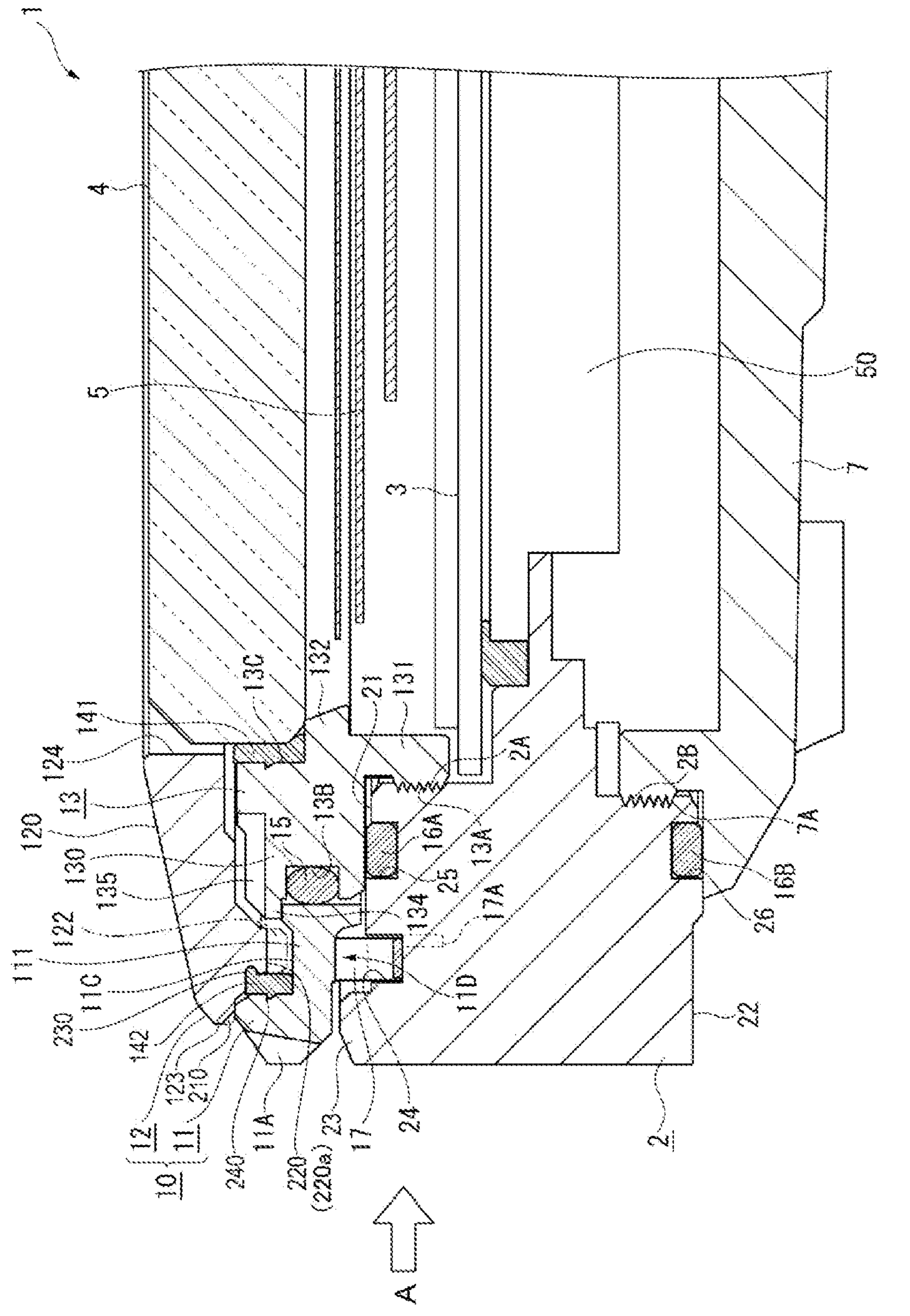
FIG. 6 is a cross-sectional view illustrating a structure around the display plate of the rotating bezel-equipped watch.

Next, the outer packaging component disposed around the display plate 12 of the rotating bezel-equipped watch 1 will be described. FIG. 6 is an enlarged cross-sectional view illustrating an enlarged periphery of the display plate 12 in the rotating bezel-equipped watch 1. Here, the case body 2, the bezel body 11, the display plate 12, and the glass bezel 13 will be more specifically described. Note that FIG. 6 illustrates a cross-sectional view of the rotating bezel-equipped watch 1 with the A direction on a left side.

As illustrated in FIG. 6, the case body 2 is formed in a substantially cylindrical shape, a female screw portion 2A is formed on an upper end portion (the front surface side of the watch) of an inner circumferential surface of the case body 2, and a female screw portion 2B is formed on a lower end portion (the rear surface side of the watch). A male screw portion 7A formed on the case back 7 is screwed into the female screw portion 2B. Thus, the case back 7 is detachably attached to the case body 2.

A recessed groove portion 24 is continuously provided in the circumferential direction in an upper surface 21 of the case body 2, i.e., in a counter surface facing the bezel body 11. A plate spring member 17 (a spring member) is attached to a bottom surface of the recessed groove portion 24. A protrusion portion 17A protruding downward is formed on the plate spring member 17. Then, the plate spring member 17 is attached to the recessed groove portion 24 by inserting the protrusion portion 17A into a fitting hole formed in the bottom surface of the recessed groove portion 24.

A protrusion portion 23 protruding toward the bezel body 11 side is continuously formed in the circumferential direction on an outer edge of the upper surface 21 of the case body 2. The protrusion portion 23 is provided on an outer circumferential side of the recessed groove portion 24, and prevents the plate spring member 17 attached to the recessed groove portion 24 from being exposed to the outside to protect the plate spring member 17.

A recessed groove portion 25 is continuously formed in the circumferential direction on an inner circumferential side of the recessed groove portion 24 of the upper surface 21 of the case body 2. Further, a recessed groove portion 26 that is concentric with the recessed groove portion 25 and has the same diameter as that of the recessed groove portion 25 is formed on a lower surface 22 of the case body 2.

Watertight gaskets 16A and 16B that are formed of an elastic member such as synthetic resin and have a watertight function are disposed in the recessed groove portions 25 and 26. The recessed groove portions 25 and 26 have the same shape, and the same type of a component can also be used for the watertight gaskets 16A and 16B.

The glass bezel 13 holds the cover glass 4 formed of sapphire glass and the like. In other words, the glass bezel 13 is formed in an annular shape, and is disposed along an outer circumferential edge of the cover glass 4.

The glass bezel 13 includes a cylindrical portion 130 having a substantially cylindrical shape, a protrusion portion 131 protruding from a lower surface of the cylindrical portion 130 toward the case back 7 side, a support portion 132 protruding from an inner circumferential surface of the cylindrical portion 130, and a holding portion 134 protruding from an outer circumferential surface of the cylindrical portion 130.

An engagement step portion 13C having a substantially L-shaped cross section is formed on the inner circumferential surface of the cylindrical portion 130 and an upper surface of the support portion 132. A plastic gasket 141 having a ring shape is disposed on the engagement step portion 13C, and the cover glass 4 is pressed onto an inner circumferential side of the plastic gasket 141. In other words, the plastic gasket 141 is pressed between the cover glass 4 and the cylindrical portion 130 to fix the cover glass 4 to the glass bezel 13 and also secure watertightness.

A male screw portion 13A is formed on an outer circumferential surface of the protrusion portion 131. The male screw portion 13A of the glass bezel 13 is screwed into the female screw portion 2A of the case body 2 described above, and thus the glass bezel 13 and the cover glass 4 are detachably attached to the case body 2. Note that the male screw portion 13A and the female screw portion 2A are a left-handed screw, and are configured such that the screws are tightened when the glass bezel 13 is rotated in a counterclockwise direction with respect to the case body 2, and the screws are loosened when the glass bezel 13 is rotated in a clockwise direction.

As described later, the holding portion 134 is located so as to protrude toward a front surface side of the bezel body 11, and regulates a movement of the bezel body 11 toward the front surface side of the watch. In other words, the holding portion 134 positions the bezel body 11 in a thickness direction of the watch (an axial direction of the case body 2).

A recessed groove portion 13B is formed in the outer circumferential surface of the cylindrical portion 130. A gasket 15 formed of an elastic member such as synthetic resin and rubber is disposed in the recessed groove portion 13B. In other words, the gasket 15 is disposed between the outer circumferential surface (the recessed groove portion 13B) of the cylindrical portion 130 of the glass bezel 13 and an inner circumferential surface of the bezel body 11, and suppresses unsteadiness of the bezel body 11 with respect to the glass bezel 13.

Figure 4:
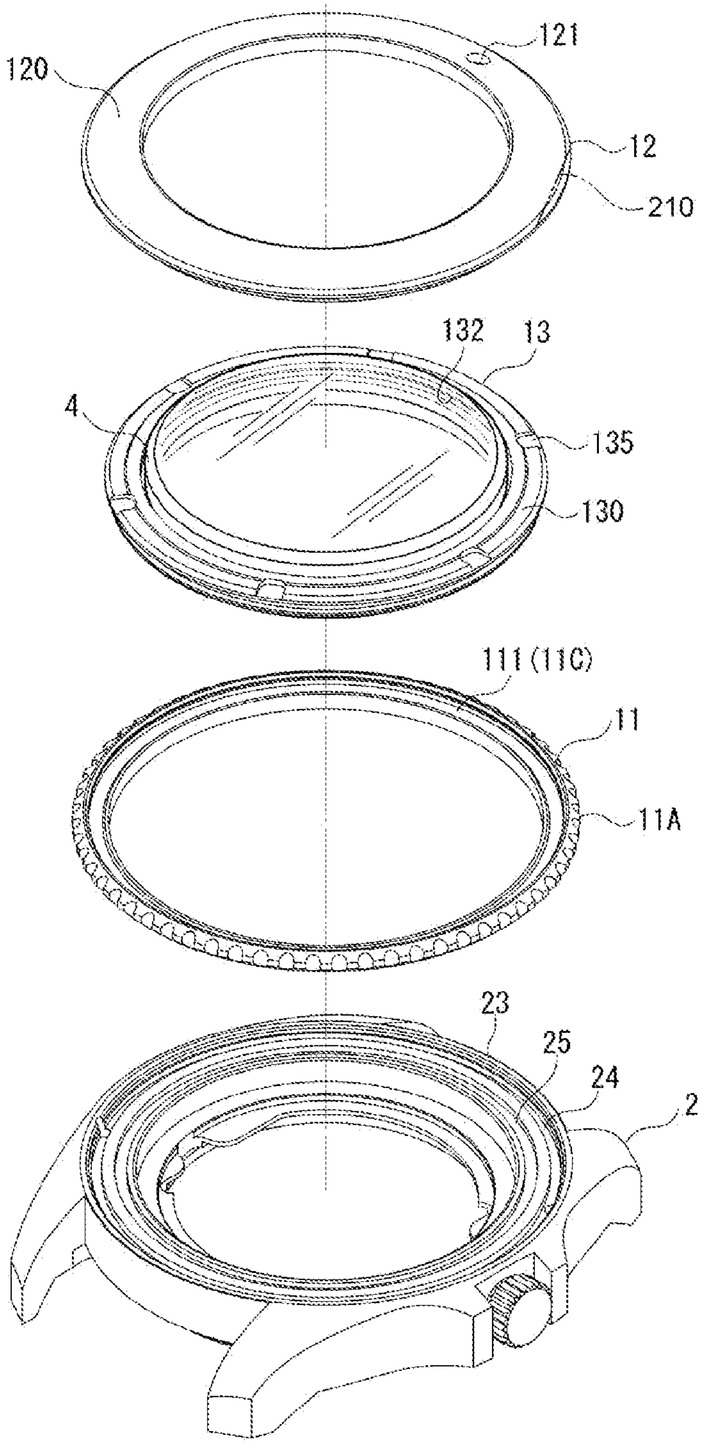
FIG. 4 is an exploded perspective view illustrating a structure of the rotating bezel-equipped watch.

Further, also, as illustrated in FIG. 4, a plurality of recessed portions 135 are formed in an upper surface of the cylindrical portion 130 (a front surface of the glass bezel 13). Then, by mounting a dedicated jig mounted on the recessed portions 135 and rotating the glass bezel 13, the male screw portion 13A of the glass bezel 13 can be tightened and loosened with respect to the female screw portion 2A of the case body 2.

The rotating bezel 10 is disposed around the cover glass 4 and the glass bezel 13, and is rotatably provided with respect to the case body 2. The rotating bezel 10 is configured to include the bezel body 11 formed in an annular shape (a ring shape), and the display plate 12 formed in an annular shape.

The bezel body 11 is an annular member formed of, for example, stainless steel, titanium, the other metal material, and the like, and includes, in the outer circumference, an operation portion 11A including a recessed portion and a protruding portion arranged in the circumferential direction. The bezel body 11 faces the upper surface 21 of the case body 2, and is disposed along the outer circumferential surface of the glass bezel 13 (specifically, the outer circumferential surface of the cylindrical portion 130).

A protrusion portion 111 protruding inward is provided on the inner circumferential surface of the bezel body 11. Then, an engagement step portion 11C having a substantially L-shaped cross section is formed on a front surface of the protrusion portion 111 and a rising surface rising from an outer circumferential side of the protrusion portion 111.

A plurality of groove portions 11D are arranged along the circumferential direction on a rear surface of the protrusion portion 111 of the bezel body 11. A tip of the plate spring member 17 engages with any groove portion 11D of the plurality of groove portions 11D, and maintains a position of the bezel body 11.

At this time, the plate spring member 17 has a function of pressing the bezel body 11 toward the front surface side with respect to the case body 2, and the tip portion of the plate spring member 17 engages with any of the plurality of groove portions 11D provided on the bezel body 11 to abut and hold the bezel body 11 against the holding portion 134 of the glass bezel 13. Further, the tip portion of the plate spring member 17 is inclined obliquely upward with respect to the bottom surface of the recessed groove portion 24, and the tip portion engages with the groove portion 11D, and thus the bezel body 11 is rotated in only one direction (the counterclockwise direction when viewed from the front surface side of the watch).

Specifically, in the plan view viewed from the front surface side of the watch, the plate spring member 17 is curved along the recessed groove portion 24, and in side view when viewed from a side surface side of the watch, one end in a direction along the recessed groove portion 24 is curved obliquely upward from the bottom surface of the recessed groove portion 24. One end (the tip) of the plate spring member 17 abuts the rear surface of the bezel body 11, and engages in an oblique direction with respect to the groove portion 11D. Thus, the plate spring member 17 blocks the rotating bezel 10 in a direction in which a side surface of the groove portion 11D abuts one end of the plate spring member 17, and thus the rotating bezel 10 does not rotate. However, in a reverse direction, the plate spring member 17 bends and is detached from the groove portion 11D, and thus the rotating bezel 10 can rotate.

As described above, the display plate 12 is the annular member, and constitutes the front surface of the rotating bezel 10. A recessed portion 121 (see FIG. 4) is formed in a display surface 120 that is a front surface of the display plate 12. A phosphorescence fluorescent coating is applied to the recessed portion 121. A mark 10A (see FIG. 1) for setting a start time is fixed to the recessed portion 121.

The first recessed portion 210 is formed in an outer circumferential edge 123 of the display plate 12 on a side that abuts the bezel body 11. The engagement protrusion 122 that engages with the engagement step portion 11C is formed on the rear surface side of the display plate 12. The engagement protrusion 122 is the circumferentially continuous rib, and the plastic gasket 142 is mounted on the outer circumferential surface of the engagement protrusion 122. A material of the plastic gasket 142 includes, for example, Teflon (registered trademark), Tefzel (registered trademark), and the like. Further, a cross-sectional shape of the plastic gasket 142 is, for example, substantially rectangular, and a corner is rounded in an arc shape.

The second recessed portion 220 is formed in a position in the engagement protrusion 122 corresponding to the first recessed portion 210. As described above, the groove portion 230 to which a part of the plastic gasket 142 enters is continuously formed in the circumferential direction in a basal portion of the engagement protrusion 122. Further, a groove portion 240 to which a part of the plastic gasket 142 enters is formed in a portion of the bezel body 11 abutted by the plastic gasket 142. The groove portion 240 is formed at approximately the same height as a height of a planar portion 220*a* of the second recessed portion 220. In this way, even when the second recessed portion 220 is formed in the engagement protrusion 122, a fixing force between the bezel body 11 and the display plate 12 can be improved by the groove portions 230 and 240.

The outer circumferential edge 123 of the display plate 12 abuts the bezel body 11 when the display plate 12 is attached to the bezel body 11. Further, the display plate 12 is formed such that an inner circumferential surface 124 thereof is located near an outer circumference of the cover glass 4. Therefore, the glass bezel 13 described above can be covered by the display plate 12, and concealed from the outside.

In other words, the engagement protrusion 122 of the display plate 12 is fitted inside and engaged with the engagement step portion 11C via the plastic gasket 142 to fix the display plate 12 to the bezel body 11. The display plate 12 and the bezel body 11 are engaged and integrated, and thus the rotating bezel 10 is configured to be rotatable with respect to the case body 2.

According to the configuration as described above, in the rotating bezel 10, a user holds and rotates the operation portion 11A of the bezel body 11, and thus the rotating bezel 10 including the display plate 12 can be integrally rotated. When the rotating bezel 10 is rotated with respect to the case body 2, the plate spring member 17 elastically deforms, is detached from the groove portion 11D with which the plate spring member 17 is engaged, and engages with a next groove portion 11D. In this way, a click feeling during the operation is obtained with the rotation of the rotating bezel 10, and the rotating bezel 10 is held in a position in which the plurality of groove portions 11D are formed.

Figure 7:
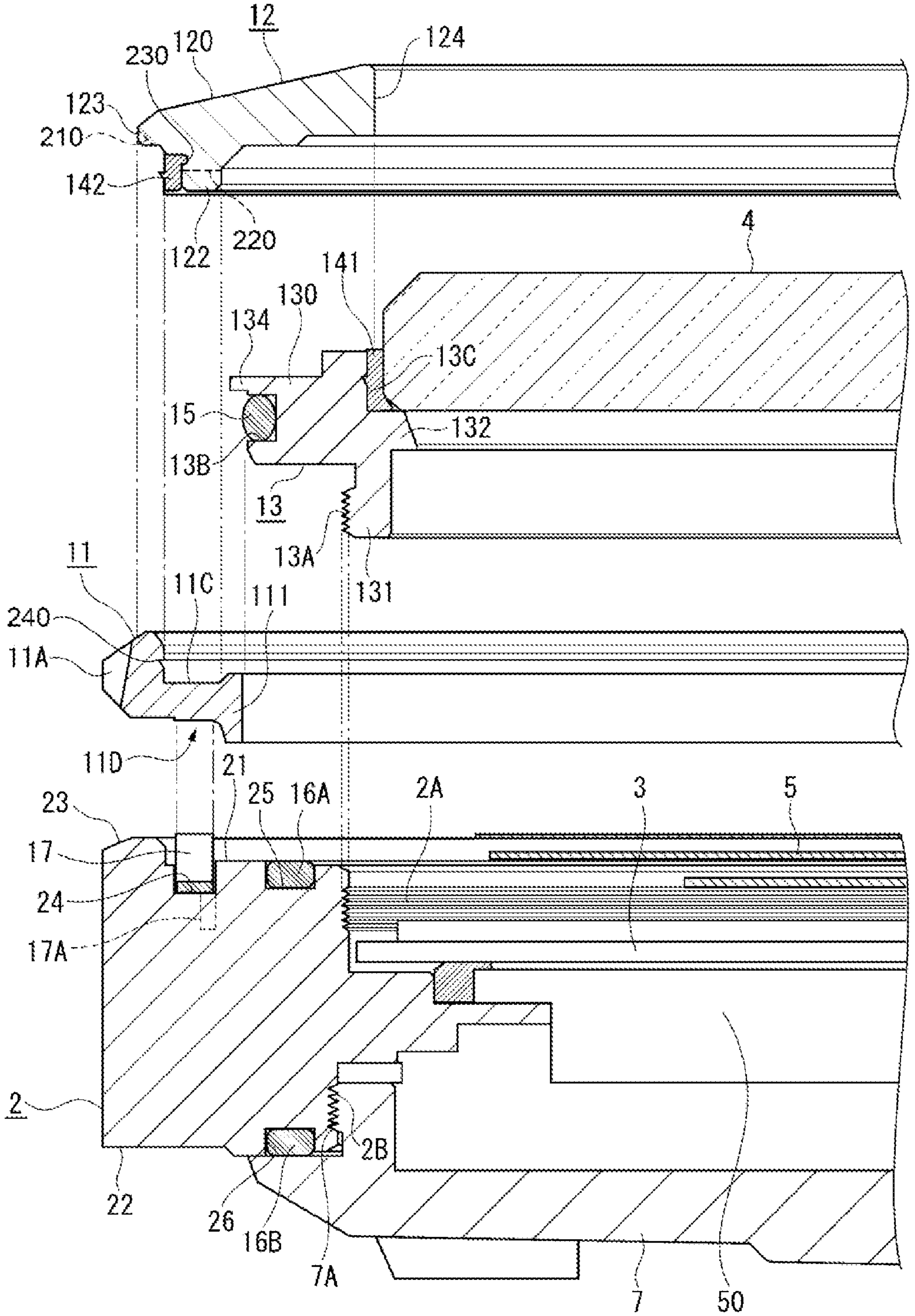
FIG. 7 is an exploded cross-sectional view illustrating the structure of the rotating bezel-equipped watch.

Next, an assembly procedure of the rotating bezel-equipped watch 1 will be described. FIG. 7 is an exploded cross-sectional view illustrating the enlarged periphery of the display plate 12 of the rotating bezel-equipped watch 1.

First, before the outer packaging component is assembled, i.e., while the bezel body 11, the display plate 12, and the glass bezel 13 are removed, the movement 50, the dial 3, and the hand 5 are incorporated from a front surface side of the case body 2, i.e., from an opening on a glass bezel side. Further, the cover glass 4 is fixed to the glass bezel 13.

Then, as illustrated in FIG. 7, the plate spring member 17 is attached to the recessed groove portion 24 of the case body 2, and the watertight gasket 16A is further disposed. Then, the bezel body 11 is brought closer to the case body 2 from the front surface side, and is disposed on the upper surface 21 of the case body 2. Specifically, the bezel body 11 is disposed in a position in which the tip portion of the plate spring member 17 fits into any of the plurality of groove portions 11D provided in the rear surface of the bezel body 11.

Then, the cover glass 4 is fixed to the glass bezel 13, and the gasket 15 is mounted on the recessed groove portion 13B. Then, the glass bezel 13 with the cover glass 4 and the gasket 15 being mounted thereon is brought closer to the case body 2 from above. Note that the bezel body 11 may be brought closer to the case body 2 side together with the glass bezel 13.

Then, the dedicated jig is attached to the plurality of recessed portions 135 (see FIG. 4) of the glass bezel 13, and the glass bezel 13 is rotated with respect to the case body 2. In this way, the male screw portion 13A of the glass bezel 13 is threadedly engaged with the female screw portion 2A of the case body 2, and is further screwed. In this way, the glass bezel 13 is screwed into the case body 2, and the upper surface 21 of the case body 2 and a rear surface of the cylindrical portion 130 of the glass bezel 13 are brought closer to each other. In this way, the protrusion portion 111 of the bezel body 11 is sandwiched between the holding portion 134 of the glass bezel 13 and the case body 2, and the bezel body 11 is rotatably held.

Here, the rotating bezel 10 varies depending on a shape of the plate spring member 17, but can basically rotate in only one direction. Then, in the present exemplary embodiment, when the glass bezel 13 is rotated in one direction in which the rotating bezel 10 can rotate, the male screw portion 13A and the female screw portion 2A are further tightened (threadedly engaged). In other words, by rotating the glass bezel 13 in the same direction as the rotational direction of the rotating bezel 10, the glass bezel 13 and the case body 2 are more firmly fixed, and thus tightness between the glass bezel 13 and the case body 2 is not released by a rotational force of the rotating bezel 10.

In such a manner, after the glass bezel 13 is fixed to the case body 2, the bezel body 11 is covered by the display plate 12 to which the plastic gasket 142 is attached, and the engagement protrusion 122 is fitted inside the engagement step portion 11C of the bezel body 11. In this way, the display plate 12 is supported by the bezel body 11 and integrated into the rotating bezel 10.

Figure 8A:
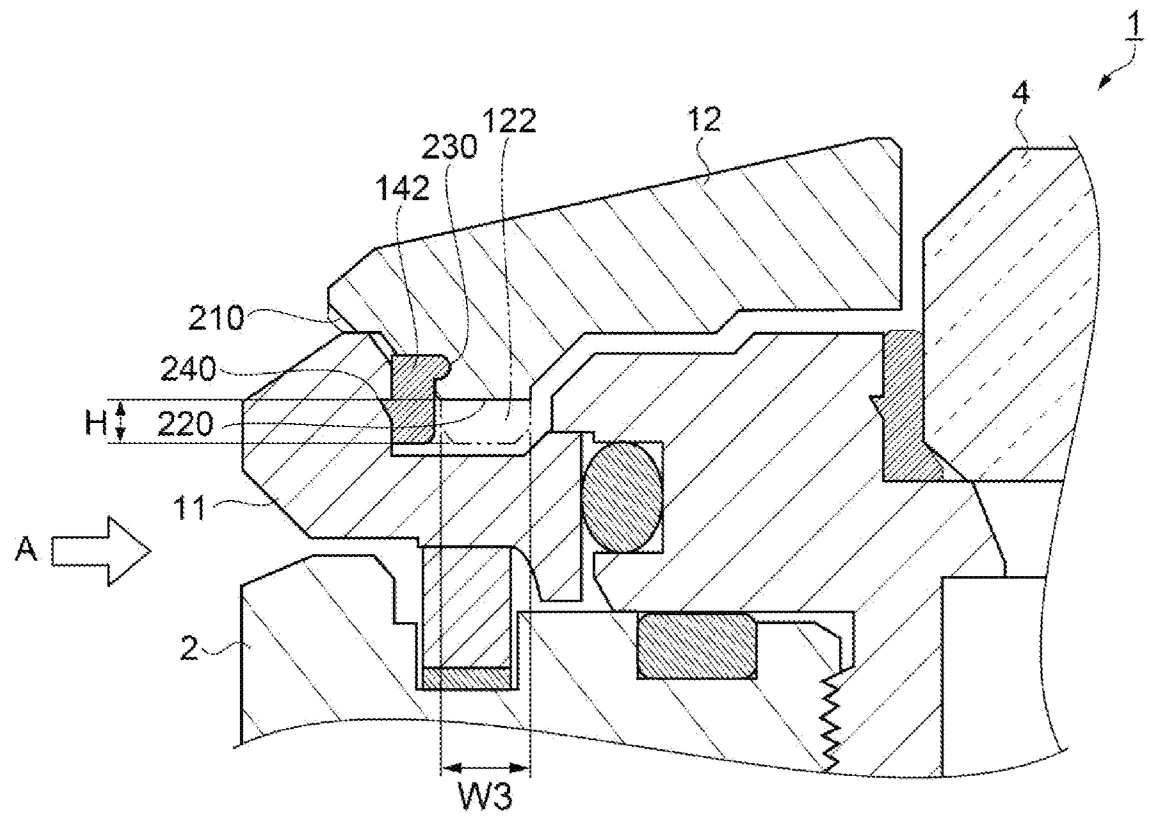
FIG. 8A is a cross-sectional view illustrating a method for removing the display plate of the rotating bezel-equipped watch.
Figure 8B:
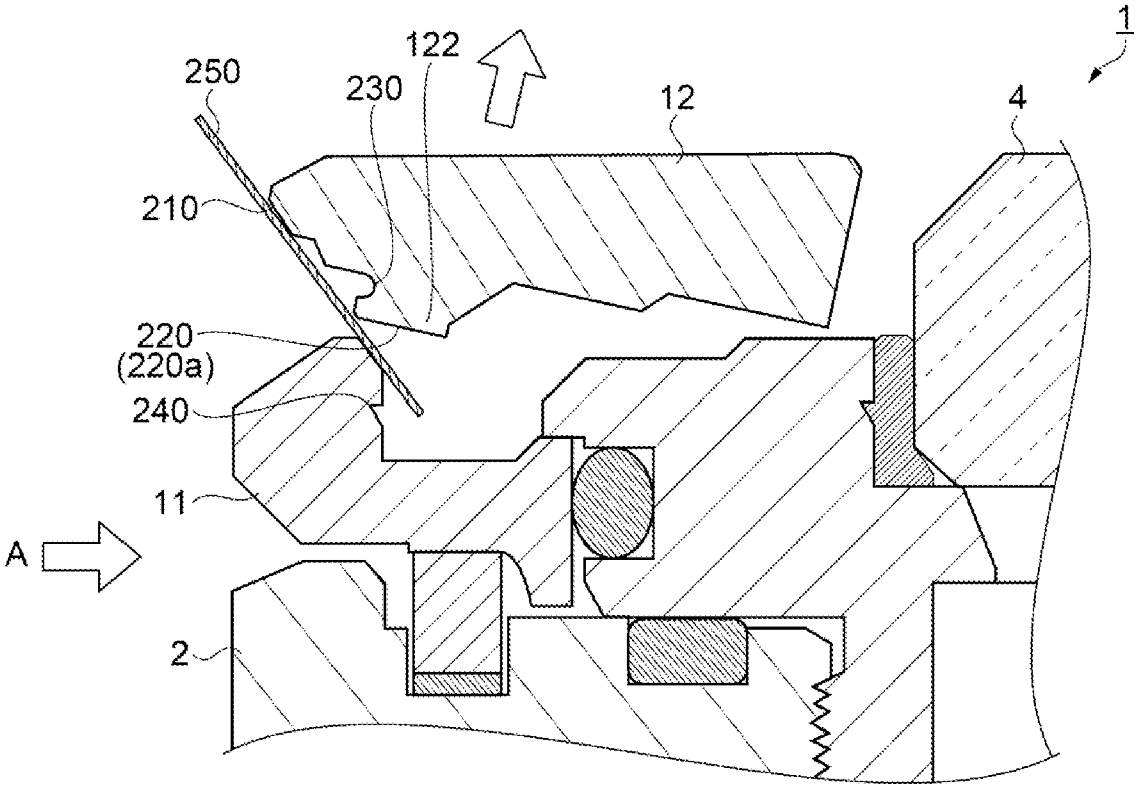
FIG. 8B is a cross-sectional view illustrating the method for removing the display plate of the rotating bezel-equipped watch.

Next, a disassembly procedure of the rotating bezel-equipped watch 1 illustrated in FIG. 6 will be described with reference to FIGS. 8A and 8B. FIGS. 8A and 8B mainly illustrate a method for removing the display plate 12 from the bezel body 11 in the disassembly procedure of the rotating bezel-equipped watch 1, and are enlarged cross-sectional views illustrating the enlarged periphery of the display plate 12 of the rotating bezel-equipped watch 1 illustrated in FIG. 6.

As illustrated in FIG. 8A, the bezel body 11 and the display plate 12 are fixed by the plastic gasket 142 disposed between the engagement protrusion 122 of the display plate 12 and the bezel body 11. Specifically, the groove portion 230 formed in the engagement protrusion 122 of the display plate 12 is continuously provided in the circumferential direction, and thus a part of the plastic gasket 142 enters the groove portion 230, and the bezel body 11 and the display plate 12 are fixed. The groove portion 230 is, for example, a recess having an arc shape.

The groove portion 230 is provided in a position in which the groove portion 230 does not interfere with the second recessed portion 220, in the present exemplary embodiment, in the basal portion of the engagement protrusion 122, and thus the groove portion 230 can be left entirely in the circumferential direction, and a fixing force between the bezel body 11 and the display plate 12 can be maintained.

Furthermore, the groove portion 240 formed on a side of the bezel body 11 that abuts the plastic gasket 142 is continuously provided in the circumferential direction, and thus a part of the plastic gasket 142 enters the groove portion 240, and the bezel body 11 and the display plate 12 are fixed.

As described above, the thickness W3 of the engagement protrusion 122 of the display plate 12 is equal to or greater than 0.7 mm (see FIGS. 8A and 5A). By setting such a thickness, when the plastic gasket 142 is incorporated between the engagement protrusion 122 and the bezel body 11, a crack to damage the engagement protrusion 122 is suppressed. A height of the engagement protrusion 122 is, for example, 0.7 mm. A depth H of the second recessed portion 220 is, for example, 0.5 mm.

A whole engagement protrusion 122 in a diameter direction is notched in the second recessed portion 220. In other words, the second recessed portion 220 penetrates the engagement protrusion 122. Thus, as in a case in which the second recessed portion 220 is formed only in a portion that the jig 250 such as a spatula comes into contact and the engagement protrusion 122 is left in the other portion, the engagement protrusion 122 can be prevented from being thinly left. Thus, damage due to a crack in the engagement protrusion 122 during assembly and the like can be suppressed.

In the removal method, as illustrated in FIG. 8B, the display plate 12 is first removed from the bezel body 11 by using the jig 250 such as a spatula. Specifically, the first recessed portion 210 formed in a part of the outer circumference of the display plate 12 (a position in the A direction) and the second recessed portion 220 formed in the engagement protrusion 122 corresponding to the position of the first recessed portion 210 are provided, and thus the jig 250 such as a spatula can smoothly get under the display plate 12 while suppressing contact with the engagement protrusion 122.

Next, the planar portion 220*a* of the second recessed portion 220 is shaken in an up-and-down direction by the jig 250 with the protruding portion of an upper surface of the bezel body 11 as a fulcrum, and thus the display plate 12 gradually rises from the bezel body 11. By repeatedly performing the operation, the display plate 12 can be removed from the bezel body 11.

After the other outer packaging component is subsequently disassembled, each component is cleaned, the component is replaced, and the assembly procedure described above is performed again, and thus the rotating bezel-equipped watch 1 can be assembled. In this way, since the movement 50 can be incorporated from the front surface side of the case body 2, it is not necessary to flip the case body 2 during assembly of the rotating bezel-equipped watch 1, and ease of assembly can also be improved.

As described above, the rotating bezel-equipped watch 1 according to the present exemplary embodiment includes the case body 2 configured to accommodate the movement 50, and the rotating bezel 10 attached to the case body 2. The rotating bezel 10 includes the bezel body 11 having an annular shape, and the display plate 12 detachably attached to the bezel body 11. The engagement protrusion 122 protruding toward the bezel body 11 and being continuous in the circumferential direction is provided on the display plate 12. The plastic gasket 142 having an annular shape is disposed between the bezel body 11 and the engagement protrusion 122. The first recessed portion 210 is provided in the outer circumference of the display plate 12. The second recessed portion 220 is provided in the engagement protrusion 122 of the display plate 12 so as to correspond to a position of the first recessed portion 210.

According to this configuration, the second recessed portion 220 is provided in the engagement protrusion 122 so as to correspond to a position of the first recessed portion 210. Since the second recessed portion 220 is a notched portion in which the engagement protrusion 122 has a low height, the jig 250 such as a spatula can be more smoothly inserted than a known configuration. Thus, damage to the display plate 12 can be prevented. Therefore, even when ceramic is used as a material of the display plate 12, the rotating bezel-equipped watch 1 in which the display plate 12 can be easily removed can be provided.

Further, the second recessed portion 220 is provided extending through the engagement protrusion 122 in the diameter direction. Thus, the engagement protrusion 122 can be prevented from being thinly left in the second recessed portion 220, and a crack in the engagement protrusion 122 due to contact with the jig 250 and the like can be suppressed.

Further, the groove portion 230 to which a part of the plastic gasket 142 enters is continuously provided in the circumferential direction in the outer circumference of the engagement protrusion 122, and the second recessed portion 220 is provided in the position that is not in contact with the groove portion 230. In other words, the groove portion 230 can be left throughout the entire engagement protrusion 122 in the circumferential direction without being affected by the second recessed portion 220, and thus a part of the plastic gasket 142 can enter the groove portion 230, and a decrease in fixing force between the bezel body 11 and the display plate 12 can be suppressed.

Further, a material of the display plate 12 is ceramic, and thus a variation of colors of the display plate 12 can be increased. Specifically, the first recessed portion 210 and the second recessed portion 220 are provided, and thus contact with the engagement protrusion 122 can be suppressed, and a brittle material such as ceramic can be used. In other words, damage when the display plate 12 is removed can be suppressed. Thus, a degree of freedom in design and function can be increased.

Figure 9:
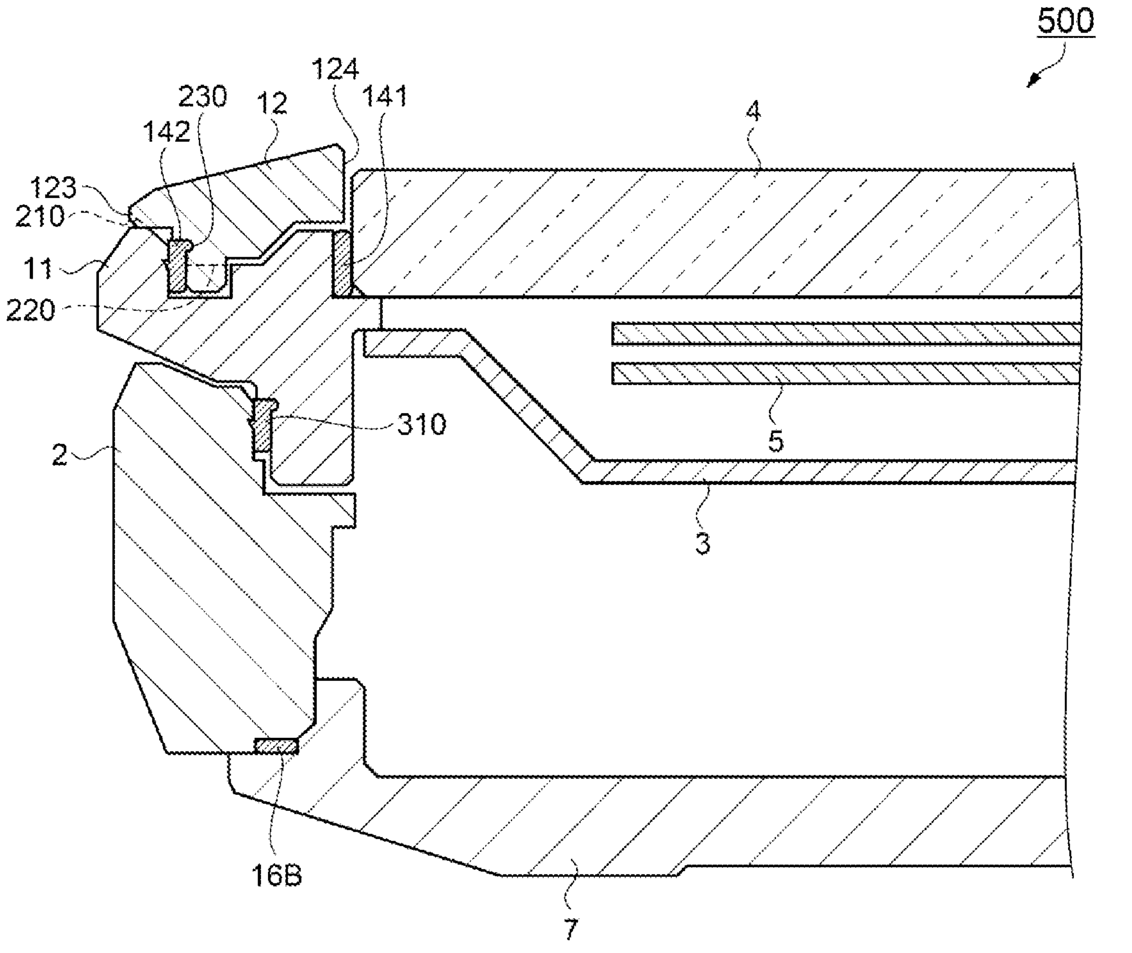
FIG. 9 is a cross-sectional view illustrating a structure of a bezel-equipped watch according to a modification example.

Note that, as described above, the present disclosure is not limited to the rotating bezel-equipped watch 1, and may be applied to a bezel-equipped watch 500 in which a bezel does not rotate. FIG. 9 is a cross-sectional view illustrating a structure of the bezel-equipped watch 500 in which the bezel does not rotate.

As illustrated in FIG. 9, the bezel-equipped watch 500 includes, as an outer packaging component that accommodates the movement 50, the case body 2, the cover glass 4, the case back 7, the bezel body 11, and the display plate 12. The case body 2 and the bezel body 11 are fixed by a plastic gasket 310. Further, as in the exemplary embodiment, the plate spring member 17 and the like for rotatably holding the bezel body 11 are not disposed between the case body 2 and the bezel body 11.

Figure 10A:
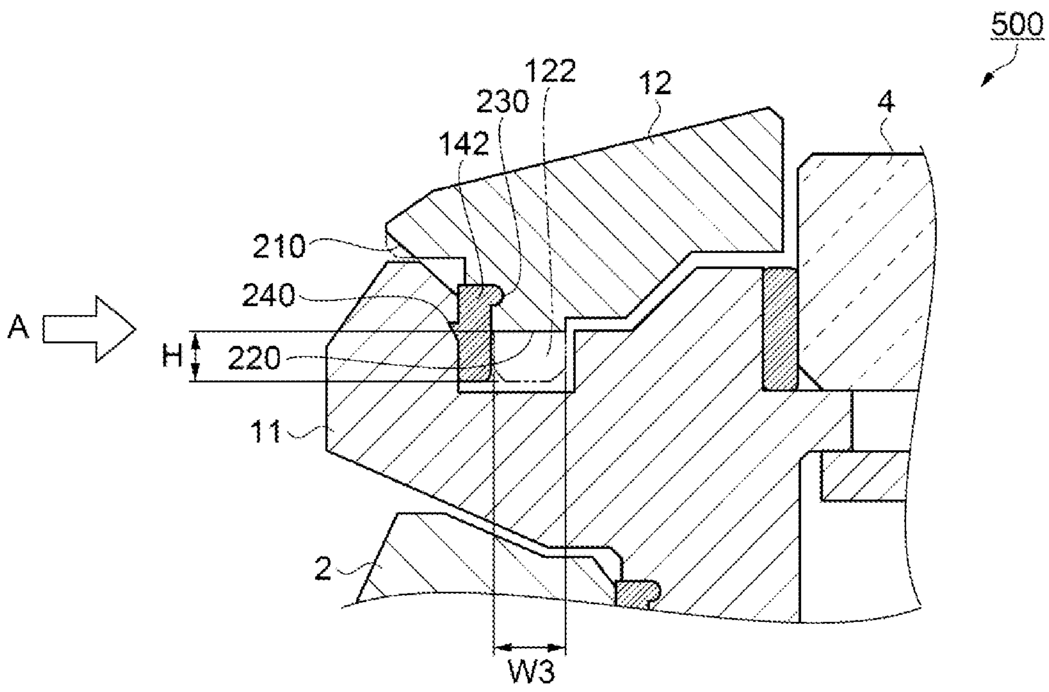
FIG. 10A is a cross-sectional view illustrating a method for removing a display plate of the bezel-equipped watch.
Figure 10B:
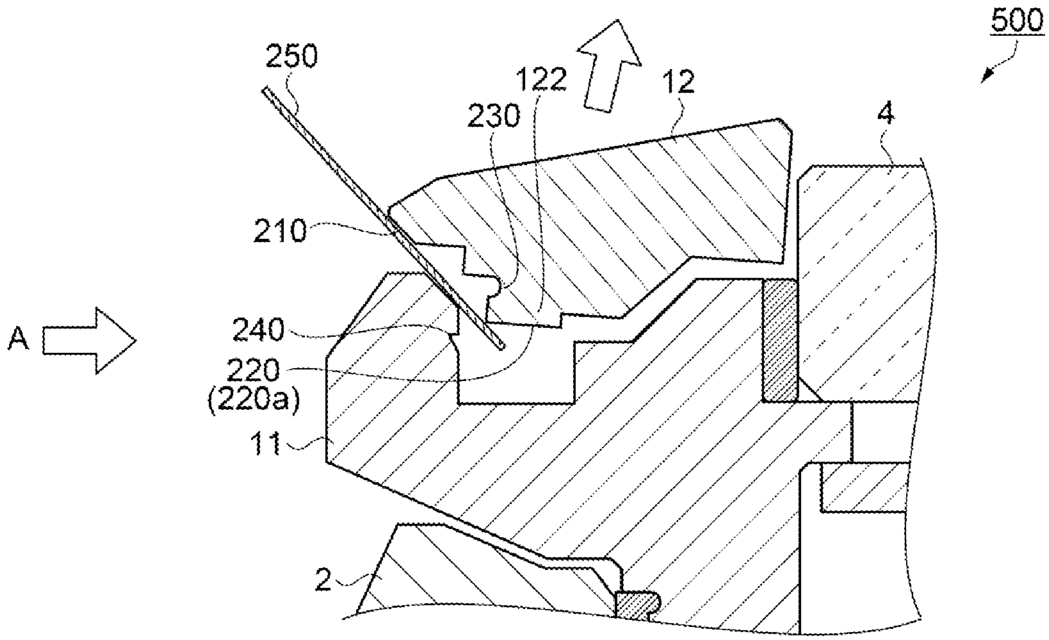
FIG. 10B is a cross-sectional view illustrating the method for removing the display plate of the bezel-equipped watch.

Next, a disassembly procedure of the bezel-equipped watch 500 illustrated in FIG. 9 will be described with reference to FIGS. 10A and 10B. FIGS. 10A and 10B mainly illustrate a method for removing the display plate 12 from the bezel body 11 in the disassembly procedure of the bezel-equipped watch 500.

As illustrated in FIG. 10A, similarly to the exemplary embodiment, the bezel body 11 and the display plate 12 are fixed by the plastic gasket 142 disposed between the engagement protrusion 122 of the display plate 12 and the bezel body 11.

Note that, as the method for removing the display plate 12 from the bezel body 11, similarly to the exemplary embodiment, as illustrated in FIG. 10B, the first recessed portion 210 formed in apart of the outer circumference of the display plate 12 (the position in the A direction) and the second recessed portion 220 formed in the engagement protrusion 122 so as to correspond to the position of the first recessed portion 210 are provided, and thus the jig 250 such as a spatula smoothly gets under the display plate 12.

Next, the planar portion 220*a* of the second recessed portion 220 is shaken in the up-and-down direction by the jig 250 with the protruding portion of the upper surface of the bezel body 11 as the fulcrum, and thus the display plate 12 gradually rises from the bezel body 11. By repeatedly performing the operation, the display plate 12 can be removed from the bezel body 11.

Further, in the exemplary embodiment described above, the first recessed portion 210 and the second recessed portion 220 are provided in only one place in the two o'clock direction, which is not limited thereto. For example, the first recessed portion 210 and the second recessed portion 220 may be provided in two places in two o'clock and eight o'clock directions. Note that the first recessed portion 210 and the second recessed portion 220 may be provided in two or more places, but may be provided in a position that is as hard as possible to see from a user in aesthetic terms. Further, in terms of a fixing force between the bezel body 11 and the display plate 12 by the plastic gasket 142, the first recessed portion 210 and the second recessed portion 220 may be provided in approximately two places. By providing the first recessed portion 210 and the second recessed portion 220 in two places 180 degrees away from each other as in the two o'clock and eight o'clock directions, the display plate 12 can be removed from the bezel body 11 in good balance by gradually prying open the display plate 12 in each position.

In this way, since the plurality of first recessed portions 210 and second recessed portions 220 are provided at the display plate 12, the display plate 12 can be gradually removed from the bezel body 11 in good balance, and partial concentration of an excessive force can be suppressed. Thus, damage to the display plate 12 can be suppressed, and maintainability can be improved.

Further, as described above, the rotating bezel-equipped watch 1 and the bezel-equipped watch 500 are described as an example, but a shape of the watch may not be circular, and may be, for example, a square type and a tonneau type (a barrel type).

What is claimed is:

1. A watch, comprising:

a case body configured to accommodate a movement; and a bezel attached to the case body, wherein the bezel includes a bezel body having an annular shape, and a display plate being detachably attached to the bezel body and having an annular shape, an engagement protrusion protruding toward the bezel body and being continuous in a circumferential direction is provided at the display plate, an elastic member having an annular shape is disposed between the bezel body and the engagement protrusion, a first recessed portion is provided in an outer circumference of the display plate, and a second recessed portion is provided in the engagement protrusion of the display plate so as to correspond to a position of the first recessed portion.

2. The watch according to claim 1, wherein the second recessed portion is provided extending through the engagement protrusion in a diameter direction.

3. The watch according to claim 1, wherein, in plan view viewed from a central axis direction of the display plate, when two imaginary lines connecting the center of the display plate and both ends of the first recessed portion are drawn, the second recessed portion is located inside the imaginary lines.

4. The watch according to claim 1, wherein, in plan view viewed from a central axis direction of the display plate, the second recessed portion is located such that an imaginary line connecting the center of the display plate and the center of the first recessed portion coincides with an imaginary line connecting the center of the display plate and the center of the second recessed portion.

5. The watch according to claim 1, wherein a groove portion to which a part of the elastic member enters is continuously provided in a circumferential direction in an outer circumference of the engagement protrusion, and the second recessed portion is provided in a position that is not in contact with the groove portion.

6. The watch according to claim 1, wherein a plurality of the first recessed portions and the second recessed portions are provided at the display plate.

7. The watch according to claim 1, wherein a material of the display plate is a brittle material.

8. The watch according to claim 1, wherein a material of the display plate is ceramic.

9. The watch according to claim 1, wherein a material of the display plate is sapphire glass.

* * * * *